(12) United States Patent
Inui

(10) Patent No.: US 12,319,584 B2
(45) Date of Patent: Jun. 3, 2025

(54) CARBON DIOXIDE FIXATION METHOD

(71) Applicant: MITSUBISHI HEAVY INDUSTRIES, LTD., Tokyo (JP)

(72) Inventor: Masayuki Inui, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 544 days.

(21) Appl. No.: 17/779,374

(22) PCT Filed: Nov. 26, 2020

(86) PCT No.: PCT/JP2020/043975
§ 371 (c)(1),
(2) Date: May 24, 2022

(87) PCT Pub. No.: WO2021/106991
PCT Pub. Date: Jun. 3, 2021

(65) Prior Publication Data
US 2022/0396492 A1 Dec. 15, 2022

(30) Foreign Application Priority Data

Nov. 29, 2019 (JP) .................. 2019-216626

(51) Int. Cl.
C01F 11/18 (2006.01)
B01D 53/62 (2006.01)
B01D 53/80 (2006.01)

(52) U.S. Cl.
CPC ............. C01F 11/18 (2013.01); B01D 53/62 (2013.01); B01D 53/80 (2013.01); B01D 2257/504 (2013.01)

(58) Field of Classification Search
CPC ......... C01F 11/18; B01D 53/62; B01D 53/80; B01D 2257/504
(Continued)

(56) References Cited

U.S. PATENT DOCUMENTS 6,221,146 B1    4/2001  Fortier et al.
2016/0237525 A1*  8/2016  Wyrsta .................... C22B 26/20

FOREIGN PATENT DOCUMENTS

JP    2005-097072 A    4/2005
JP    2017-513806 A    6/2017
(Continued)

OTHER PUBLICATIONS

International Search Report of PCT/JP2020/043975 dated Feb. 2, 2021 (9 pages).
(Continued)

Primary Examiner — Anita Nassiri-Motlagh
(74) Attorney, Agent, or Firm — Osha Bergman Watanabe & Burton LLP

(57) ABSTRACT

A carbon dioxide fixation method includes a step of preparing a calcium-containing substance containing calcium, a step of preparing a calcium extraction substance for extracting calcium ions from the calcium-containing substance by a reaction with the calcium-containing substance to produce a calcium-containing intermediate, a step of producing a gel including the calcium-containing intermediate, by mixing the calcium-containing substance and the calcium extraction substance, a step of supplying a basic substance and carbon dioxide to the gel including the calcium-containing intermediate to precipitate calcium carbonate which is slightly soluble, and a step of removing the precipitated calcium carbonate.

5 Claims, 3 Drawing Sheets

(58) Field of Classification Search
USPC .......................................................... 423/230
See application file for complete search history.

(56) References Cited

FOREIGN PATENT DOCUMENTS

| | | |
|---|---|---|
| JP | 2019-052065 A | 4/2019 |
| JP | 2019-115888 A | 7/2019 |
| KR | 101970265 B1 | 4/2019 |
| WO | 2015-168159 A1 | 11/2015 |

OTHER PUBLICATIONS

International Preliminary Report on Patentability mailed on Jun. 9, 2022 in corresponding International (PCT) Application No. PCT/JP2020/043975 (12 pages).
The extended European Search Report dated Dec. 8, 2022, issued to the corresponding EP application No. 20891693.2 (8 pages).

* cited by examiner

CARBON DIOXIDE FIXATION METHOD

TECHNICAL FIELD

The present disclosure relates to a carbon dioxide fixation.

BACKGROUND

In recent years, global warming due to an increase in concentration of carbon dioxide in the atmosphere has become a problem, and a technique for recovering carbon dioxide in the atmosphere has been developed. As such technique, Carbon dioxide Capture and Storage (CCS) or Enhanced Oil Recovery (EOR) is known (see, for example, Patent Document 1).

CITATION LIST

Patent Literature

Patent Document 1: JP2019-115888A

SUMMARY

Technical Problem

Meanwhile, in order to fix carbon dioxide in the atmosphere, it is important that a large amount of carbon dioxide can be fixed, a cost is low, and carbon dioxide can semipermanently be fixed. From this point of view, the present inventors have considered fixing carbon dioxide in large amounts and at a low cost by reacting carbon dioxide with an inorganic material existing in large amounts on the earth to be converted into a solid of slightly-soluble carbonate. Such technical idea is not described at least in Patent Document 1.

In view of the above, an object of at least one embodiment of the present disclosure is to provide a carbon dioxide fixation method capable of fixing carbon dioxide in large amounts and at a low cost.

Solution to Problem

In order to achieve the above object, a carbon dioxide fixation method according to the present disclosure includes a step of preparing a calcium-containing substance containing calcium, a step of preparing a calcium extraction substance for extracting calcium ions from the calcium-containing substance by a reaction with the calcium-containing substance to produce a calcium-containing intermediate, a step of producing a gel including the calcium-containing intermediate, by mixing the calcium-containing substance and the calcium extraction substance, a step of supplying a basic substance and carbon dioxide to the gel including the calcium-containing intermediate to precipitate calcium carbonate which is slightly soluble, and a step of removing the precipitated calcium carbonate.

Advantageous Effects

With the carbon dioxide fixation method according to the present disclosure, the reaction between the calcium-containing substance and the calcium extraction substance produces the calcium-containing intermediate, and the reaction between the calcium-containing intermediate, and the basic substance and carbon dioxide precipitates calcium carbonate which is slightly soluble, fixing carbon dioxide as calcium carbonate. Thus, it is possible to fix carbon dioxide in large amounts and at a low cost, as well as semipermanently.

DETAILED DESCRIPTION

Hereinafter, a carbon dioxide fixation method according to embodiments of the present disclosure will be described with reference to the drawings. The embodiments each indicate one aspect of the present disclosure, do not intend to limit the present disclosure, and can optionally be modified within a range of a technical idea of the present disclosure.

<Outline of Carbon Dioxide Fixation Method of Present Disclosure>

Figure 1:
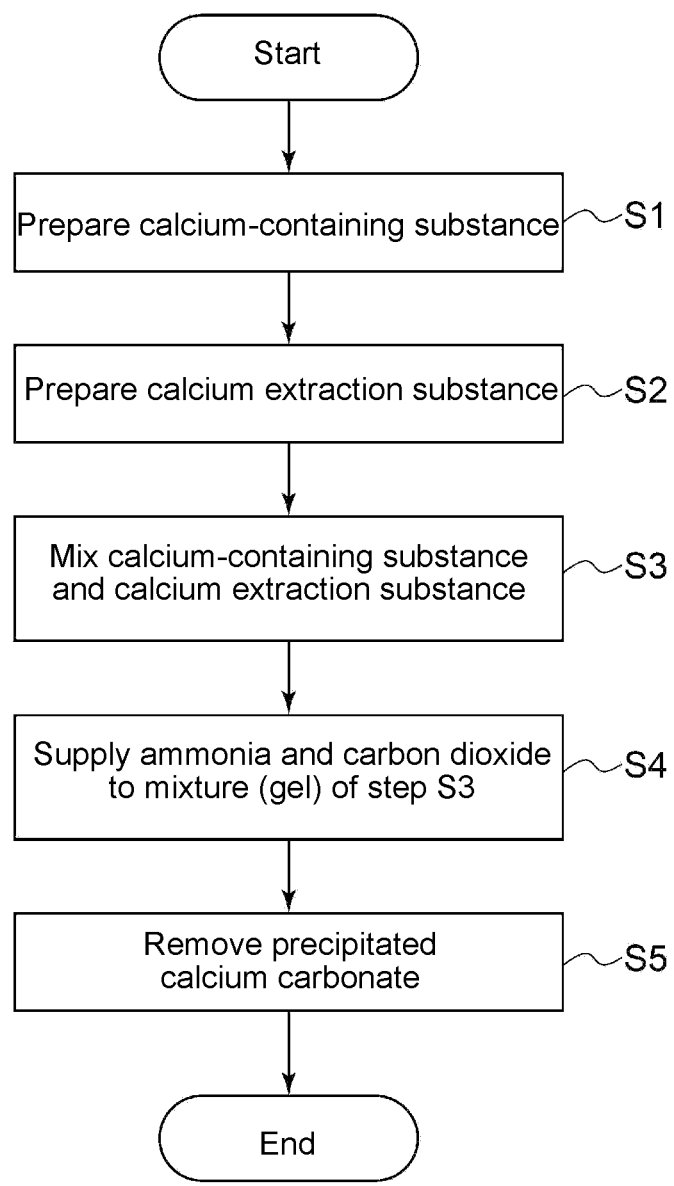
FIG. 1 is a flowchart showing the outline of a carbon dioxide fixation method according to an embodiment of the present disclosure.

FIG. 1 shows the outline of a carbon dioxide fixation method according to an embodiment of the present disclosure. First, a calcium-containing substance is prepared (step S1), and a calcium extraction substance is prepared (step S2). The order of step S1 and step S2 is not limited to this, but the preparation of the calcium extraction substance may be referred to as step S1 and the preparation of the calcium-containing substance may be referred to as step S2.

Herein, the calcium-containing substance is slightly-soluble or soluble calcium salt containing calcium. Such calcium-containing substance includes wollastonite (calcium silicate ($CaSiO_3$), phosphate rock (calcium phosphate ($Ca_3(PO_4)_2$)), gypsum (calcium sulfate dihydrate ($CaSO_4 \cdot 2H_2O$)), or the like. Gypsum is produced when phosphoric acid is produced from mined phosphate rock, and most of the gypsum is usually landfilled. If residual acidic water elutes into the landfilled gypsum, an acid lake is formed, causing an environmental problem. By contrast, if gypsum is used as the calcium-containing substance, in addition to being able to fix carbon dioxide by an operation to be described later, it is also possible to solve the above-described environmental problem.

Further, the calcium extraction substance is a substance that extracts calcium ions from the calcium-containing substance by reacting with the calcium-containing substance to produce a calcium-containing intermediate. Such calcium extraction substance can include carboxylic acid or carboxylate having a linear or cyclic carbon chain, protein containing a carboxyl group, pectin or the like. It is also possible to simultaneously use some of these as the calcium extraction substances. Further, as a substance for promoting the extraction of calcium, a chelating agent containing a nitrogen atom and a carboxyl group may be used in combination.

For example, carboxylic acid and carboxylate are represented by chemical formulas R—COOH and R—COOX, respectively, where R is a linear or cyclic carbon chain, and X can be ammonium ion ($NH_4^+$), sodium ion ($Na^+$), potassium ion ($K^+$), or the like. Alginic acid can be used as such carboxylic acid, and ammonium alginate ($AlgNH_4$) can be used as such carboxylate. In addition to a carbon atom and a hydrogen atom, R may contain an oxygen atom, a nitrogen atom, a sulfur atom, a phosphorus atom, or the like. Further, as the chelating agent containing the nitrogen atom and the carboxyl group, ethylenediaminetetraacetic acid (EDTA), hydroxyethylethylenediaminetriacetic acid (HEDTA), diethylenetriaminepentaacetic acid (DTPA), nitrilotriacetic acid (NTA), or the like can be used.

After step S1 and step S2, the calcium-containing substance and the calcium extraction substance are mixed (step S3), thereby reacting the calcium-containing substance and the calcium extraction substance. For example, the reaction between gypsum and ammonium alginate is represented by:

$$CaSO_4.2H_2O+2AlgNH_4 \rightarrow Alg_2Ca+(NH_4)_2SO_4+2H_2O \quad (1)$$

The calcium-containing intermediate in this case is calcium alginate ($Alg_2Ca$), and is obtained in the form of a gel.

Subsequent step S4 includes supplying ammonia and carbon dioxide to the gel containing the calcium-containing intermediate. As a result, the calcium-containing intermediate reacts with ammonia and carbon dioxide, precipitating calcium carbonate. That is, the supplied carbon dioxide is fixed as calcium carbonate. By removing the precipitated calcium carbonate by filtration or the like (step S5), the fixed carbon dioxide can be used as calcium carbonate. The source of carbon dioxide is not particularly limited, but for example, carbon dioxide which is captured from a combustion gas discharged from a combustion device of any plant may be used.

As described above, the reaction between the calcium-containing substance and the calcium extraction substance produces the calcium-containing intermediate, and the reaction between the calcium-containing intermediate, and ammonia and carbon dioxide precipitates calcium carbonate which is slightly soluble, fixing carbon dioxide as calcium carbonate. Thus, it is possible to fix carbon dioxide in large amounts and at a low cost, as well as semipermanently.

Figure 2:
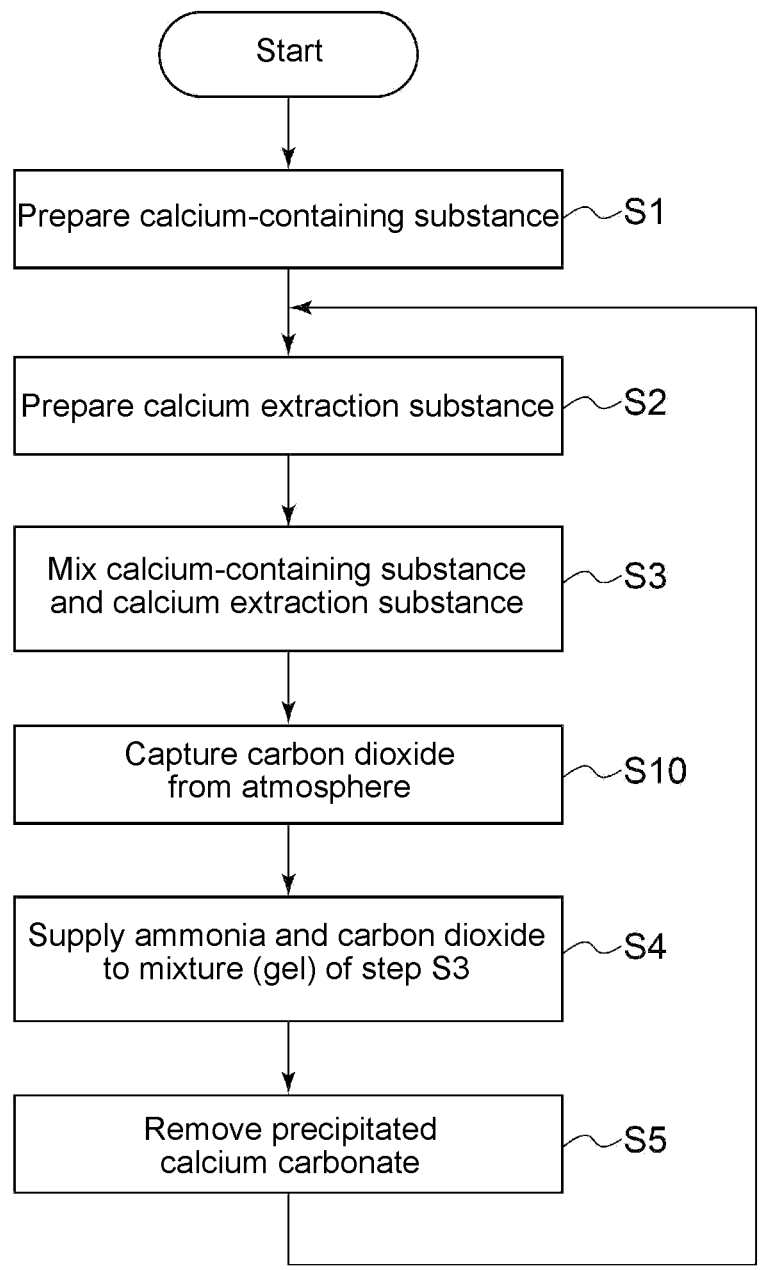
FIG. 2 is a flowchart showing the outline of the carbon dioxide fixation method according to another embodiment of the present disclosure.

FIG. 2 shows the outline of the carbon dioxide fixation method according to another embodiment of the present disclosure. The operation from step S1 to step S3 is the same as that in the embodiment of FIG. 1. In the present embodiment, the carbon dioxide supplied in step S4 is captured from the atmosphere (step S10). The method for capturing carbon dioxide from the atmosphere is not particularly limited, but, for example, a Direct Air Capture (DAC) plant may be used. By supplying the carbon dioxide captured from the atmosphere, it is possible to fix carbon dioxide in the atmosphere in large amounts and at a low cost, as well as semipermanently.

After step S10, step S4 and step S5 are performed in the same manner as in the embodiment of FIG. 1. In order to reuse the residual substance from which calcium carbonate has been removed in step S5 as the calcium extraction substance, the process may be returned to step S2. The operation of reusing the residual substance from which calcium carbonate has been removed in step S5 as the calcium extraction substance is also applicable to the embodiment of FIG. 1. By reusing the calcium extraction substance, it is possible to reduce the consumption of the calcium extraction substance, making it possible to reduce the cost of the carbon dioxide fixation method.

Step S4 of the carbon dioxide fixation method shown in FIGS. 1 and 2 may supply, instead of ammonia, an optional basic substance such as caustic soda.

<Example of Carbon Dioxide Fixation Method of Present Disclosure>

Example 1

Figure 3:
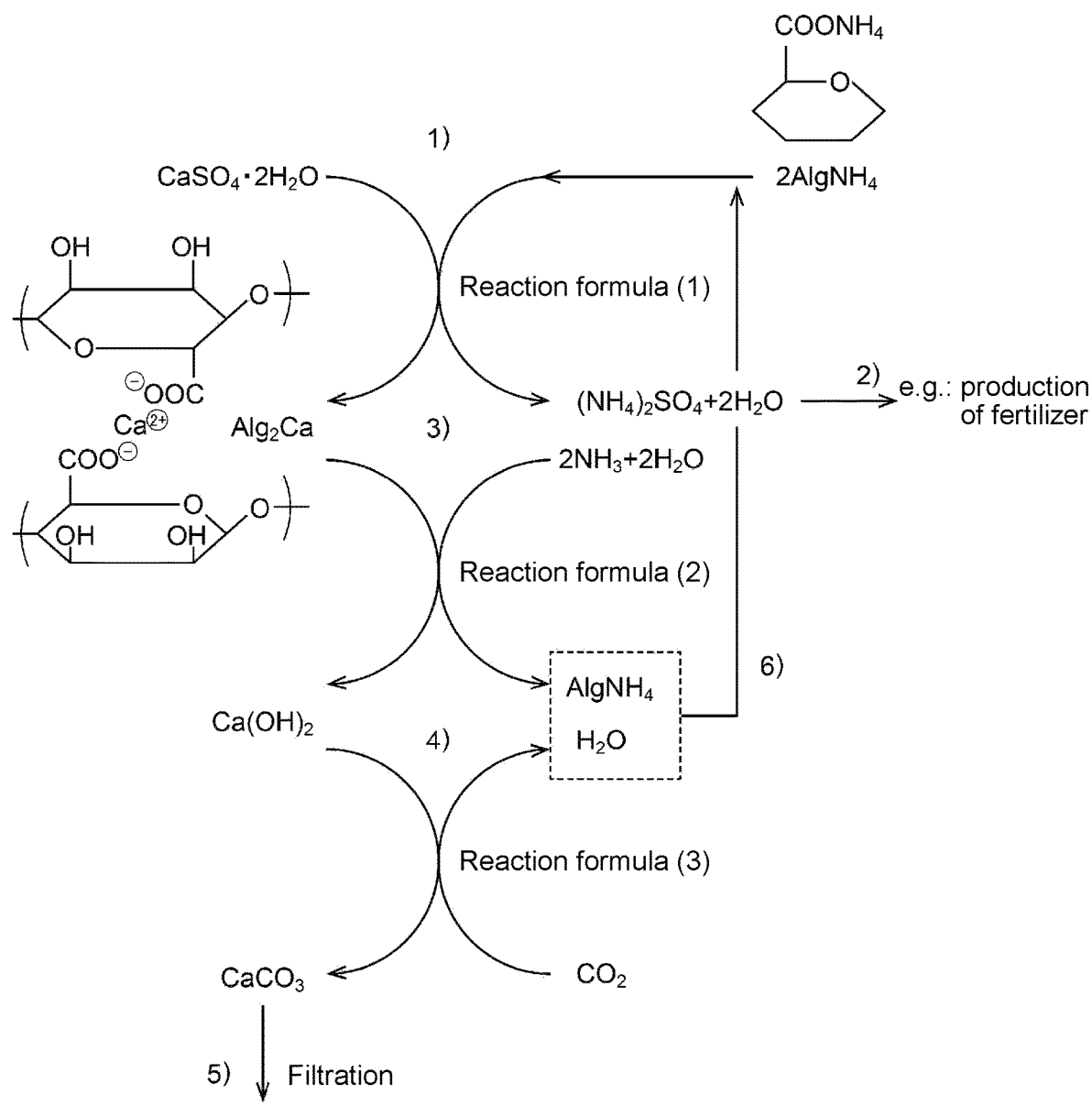
FIG. 3 is a diagram for describing Example 1 of the carbon dioxide fixation method of the present disclosure.

The carbon dioxide fixation method according to Example 1 will be described with reference to FIG. 3. In Example 1, gypsum ($CaSO_4.2H_2O$) was used as the calcium-containing substance, and ammonium alginate ($AlgNH_4$) was used as the calcium extraction substance.

1)

After 0.42 g (0.0012 mol of $CaSO_4$) of gypsum is dissolved in 100 ml of pure water, 50 ml of 0.8 mass % ammonium alginate solution (0.0019 mol of $AlgNH_4$) is added, whereby ammonium sulfate (($NH_4$)$_2SO_4$) and calcium alginate ($Alg_2Ca$) which is the gelled calcium-containing intermediate were produced. Ammonium sulfate is in the form of an aqueous solution.

2) Ammonium sulfate obtained by the reaction can be used as a raw material for producing fertilizer, for example.

3) 10 ml of an ammonia aqueous solution (0.15 mol of ammonia) was supplied to the gelled calcium alginate. As a result, the reaction occurs which is represented by: In place of the ammonia aqueous solution, it is also possible to supply as ammonia gas.

$$Alg_2Ca+2NH_3+2H_2O \rightarrow Ca(OH)_2+2AlgNH_4 \quad (2)$$

4) By the reaction of the reaction formula (2), calcium hydroxide ($Ca(OH)_2$) and ammonium alginate are dissolved in the aqueous solution. Carbon dioxide gas was supplied to the aqueous solution for four hours. The reaction represented by the following reaction formula (3) occurred due to the supply of carbon dioxide gas, and a white precipitate was confirmed about one hour after the supply of carbon dioxide gas:

$$Ca(OH)_2+CO_2 \rightarrow CaCO_3+H_2O \quad (3)$$

5) When the white precipitate was separated by filtration or the like after the supply of carbon dioxide gas was stopped, the mass of the white precipitate was 0.13 g. When the white precipitate was analyzed by X-ray diffraction (XRD), it was confirmed that the white precipitate was 0.001 mol of calcium carbonate. From this result, it was confirmed that calcium in the used gypsum can be converted into calcium carbonate with a high yield of about 85%. That is, the fixed carbon dioxide was captured as calcium carbonate. The captured calcium carbonate can be used as a building material. Calcium carbonate can also be landfilled, and in this case, the formation of an acidic lake is suppressed, which also solves the environmental problem that the acidic lake is formed.

6) Separation of the precipitated calcium carbonate gave an aqueous solution of ammonium alginate. The aqueous solution of ammonium alginate can be used as a part of the aqueous solution of ammonium alginate in 1) above.

In Example 1, gel-like calcium alginate is produced by supplying ammonium alginate, making it possible to prevent contamination of another metal. Thus, it is possible to suppress precipitation of impurities, and to increase the purity of calcium carbonate obtained by filtration.

The contents described in the above embodiments would be understood as follows, for instance.

[1] A carbon dioxide fixation method according to an aspect includes a step of preparing a calcium-containing substance containing calcium, a step of preparing a calcium extraction substance for extracting calcium ions from the calcium-containing substance by a reaction with the calcium-containing substance to produce a calcium-containing intermediate, a step of producing a gel including the calcium-containing intermediate, by mixing the calcium-containing substance and the calcium extraction substance, a step of supplying a basic substance and carbon dioxide to the gel including the calcium-containing intermediate to precipitate calcium carbonate which is slightly soluble, and a step of removing the precipitated calcium carbonate.

With the carbon dioxide fixation method according to the present disclosure, the reaction between the calcium-containing substance and the calcium extraction substance produces the calcium-containing intermediate, and the reaction between the calcium-containing intermediate, and the basic substance and carbon dioxide precipitates calcium carbonate which is slightly soluble, fixing carbon dioxide as calcium carbonate. Thus, it is possible to fix carbon dioxide in large amounts and at a low cost, as well as semipermanently.

[2] A carbon dioxide fixation method according to another aspect is the carbon dioxide fixation method according to [1], where a residual substance from which calcium carbonate has been removed is reused as an aqueous solution of the calcium extraction substance.

With the above configuration, since the calcium extraction substance can be reused, it is possible to reduce the consumption of the calcium extraction substance, and to reduce the cost of the carbon dioxide fixation method. Further, the removed calcium carbonate can also be used for various purposes.

[3] A carbon dioxide fixation method according to still another aspect is the carbon dioxide fixation method according to [1] or [2], that further includes a step of capturing carbon dioxide in the atmosphere. The carbon dioxide captured from the atmosphere is supplied to the gel including the calcium-containing intermediate.

With the above configuration it is possible to fix carbon dioxide in the atmosphere in large amounts and at a low cost, as well as semipermanently.

[4] A carbon dioxide fixation method according to yet another aspect is the carbon dioxide fixation method according to any one of [1] to [3], where the calcium extraction substance is at least one of carboxylic acid or carboxylate having a linear or cyclic carbon chain, protein containing a carboxyl group, or pectin. Further, for the purpose of promoting the extraction of calcium, a chelating agent containing a nitrogen atom and a carboxyl group may be used in combination.

With the above configuration, the calcium extraction substance extracts calcium ions from the calcium-containing substance to produce the calcium-containing intermediate, making it possible to supply the basic substance and carbon dioxide to the gel including the calcium-containing intermediate to precipitate calcium carbonate which is slightly soluble. Thus, it is possible to fix carbon dioxide in the atmosphere in large amounts and at a low cost, as well as semipermanently.

[5] A carbon dioxide fixation method according to yet another aspect is the carbon dioxide fixation method according to any one of [1] to [4], where the calcium-containing substance is gypsum, wollastonite, or phosphate rock.

Gypsum is also produced when phosphoric acid is produced from mined phosphate rock, and most of the gypsum is landfilled. If residual acidic water elutes into the landfilled gypsum, an acid lake is formed, causing an environmental problem. By contrast, if gypsum is used as the calcium-containing substance, in addition to carbon dioxide fixation, it is also possible to solve the above-described environmental problem.

The invention claimed is:

1. A carbon dioxide fixation method, comprising:
    a step of preparing a calcium-containing substance containing calcium;
    a step of preparing a calcium extraction substance for extracting calcium ions from the calcium-containing substance by a reaction with the calcium-containing substance to produce a calcium-containing intermediate;
    a step of mixing the calcium-containing substance and the calcium extraction substance to produce a gel including the calcium-containing intermediate;
    a step of supplying a basic substance and carbon dioxide to the gel including the calcium-containing intermediate to precipitate calcium carbonate which is slightly soluble; and
    a step of removing the precipitated calcium carbonate.

2. The carbon dioxide fixation method according to claim 1, wherein a residual substance from which calcium carbonate has been removed is reused as the calcium extraction substance.

3. The carbon dioxide fixation method according to claim 1, further comprising:
    a step of capturing carbon dioxide in the atmosphere, wherein
    the carbon dioxide captured from the atmosphere is supplied to the gel including the calcium-containing intermediate.

4. The carbon dioxide fixation method according to claim 1, wherein the calcium extraction substance is at least one of carboxylic acid or carboxylate having a linear or cyclic carbon chain, protein containing a carboxyl group, or pectin.

5. The carbon dioxide fixation method according to claim 1, wherein the calcium-containing substance is gypsum, wollastonite, or phosphate rock.

* * * * *